United States Patent [19]
Chlupsa

[11] Patent Number: 5,151,144
[45] Date of Patent: Sep. 29, 1992

[54] PROCESS FOR THE MANUFACTURING OF A PERFORATED TUBE FOR AN EXPANSION SHAFT

[75] Inventor: Otto Chlupsa, Goethestr 52, D-6070 Langen, Fed. Rep. of Germany

[73] Assignees: Walter Vetter; Otto Chlupsa, both of Fed. Rep. of Germany

[21] Appl. No.: 537,511

[22] Filed: Jun. 13, 1990

[30] Foreign Application Priority Data

Jun. 15, 1989 [DE] Fed. Rep. of Germany ... 8907321[U]
Jul. 20, 1989 [EP] European Pat. Off. ........... 89113331
Jul. 20, 1989 [EP] European Pat. Off. ........... 89113332

[51] Int. Cl.⁵ .................... B65H 81/00; B31C 13/00
[52] U.S. Cl. .................... 156/171; 156/173; 156/175; 156/189; 156/190; 156/252
[58] Field of Search .......... 156/173, 169, 175, 189, 156/190, 197, 252, 513, 514, 171; 428/116, 36.3

[56] References Cited

U.S. PATENT DOCUMENTS

| | | | |
|---|---|---|---|
| 3,013,584 | 12/1961 | Reed et al. | 156/197 X |
| 3,259,961 | 7/1966 | Bryand | 156/197 X |
| 3,490,983 | 1/1970 | Lee | 428/36.3 X |
| 3,765,980 | 10/1973 | Hurlbut, Sr. et al. | 156/175 |
| 4,025,675 | 5/1977 | Jonda | 428/116 X |
| 4,248,062 | 2/1981 | McLain et al. | 156/173 X |
| 4,563,321 | 1/1986 | Gessford | 156/197 X |
| 4,565,595 | 1/1986 | Whitener | 156/156 |
| 4,600,619 | 7/1986 | Chee et al. | 156/173 X |
| 4,647,326 | 3/1987 | Pott | 156/197 X |
| 4,657,795 | 4/1987 | Foret | 428/36.3 X |
| 4,773,656 | 9/1988 | Chlupsa . | |
| 4,786,536 | 11/1988 | Kaempen | 428/36.3 |

FOREIGN PATENT DOCUMENTS

62-257835 11/1987 Japan ................... 156/172

Primary Examiner—Jeff H. Aftergut
Attorney, Agent, or Firm—Oldham, Oldham & Wilson Co.

[57] ABSTRACT

Process for the manufacture of a tube for an expansion shaft. A plurality of fiber strata, each consisting essentially of long continuous fibers, and at least one layer of honeycomb material, the fiber strata and the layer(s) of honeycomb material being in alternating sequence forming are a sandwich compound, are applied to a mandrel having moldings or projections thereon. The fiber strata are applied so that few if any fibers are severed by the moldings. The tube has apertures, which are formed by the moldings. In order that the necessary openings do not weaken the structure of the carbon fibers, they are placed around the moldings forming the apertures and afterwards the sandwich compound is saturated with epoxy. The remarkable feature of the tube is the extremely light weight and the resulting advantages especially with regard to its handling.

5 Claims, 3 Drawing Sheets

PROCESS FOR THE MANUFACTURING OF A PERFORATED TUBE FOR AN EXPANSION SHAFT

TECHNICAL FIELD

This invention relates to a process for the manufacture of a tube for a expansion shaft, which tube has apertures therein.

BACKGROUND ART

The diameter of expansion shafts can be changed in a controlled manner so that cores with rolls of material wound onto them with the help of the expansion shafts can pivot and if necessary be driven. In order to enable the expansion shafts to change their diameter they are provided with apertures through which clamping devices penetrate in radial direction to the shaft in order to effect the necessary change of the external diameter of the expansion shaft. An example for expansion shafts of this kind can be found in U.S. Pat. No. 4,773,656 and in the German design registry No. DE-U-86 34 752.

The tubes of conventional expansion shafts are made of steel or aluminum. In order to apply the apertures to the tube, a steel tube is machined accordingly. This procedure is very labor intensive. Furthermore, a tube of this kind is quite heavy due to the metal used.

DISCLOSURE OF THE INVENTION

Therefore, the invention is based on the objective to suggest a process by which a tube for an expansion shaft provided with openings can be produced, which is remarkable in that it has a significantly lower weight without losing its mechanical qualities.

Towards the achievement of this objective the invention provides a process wherein a perforated composite tube is formed on an inner form or mandrel matching the inside diameter of the desired perforated tube and having projections or moldings aligned with the desired openings or apertures in the tubes; wherein a plurality of (i.e. two or more) spaced fiber strata, each consisting essentially of long continuous fibers, and one or more honeycomb layers and applied, each honeycomb layer being sandwiched between successive fiber strata so that fiber strata and honeycomb layers are in alternating sequence to form a sandwich structure or compound are applied to the mandrel, the fibers being placed around the moldings so that substantially no fibers are severed; and wherein the resulting sandwich compound or composite on the mandrel is saturated with epoxy which hardens afterwards. After the epoxy has hardened, the inner form is removed from the resulting compound.

The composite may have an inside fiber stratum, an outside fiber stratum and a middle layer of honeycomb material therebetween, or may have an inside fiber stratum, one or more intermediate fiber strata, and a layer of honeycomb material between each pair of succession or fiber strata.

One therefore departs from the prior art whereby such tubes in principle have to be made of suitable metal (solid material) and produces—according to the invention—a composite tube from a light weight honeycomb material sandwiched between layers of fiber. The entire construction is then saturated with epoxy so that a sturdy structure results after the epoxy is set results. Tests have shown that a tube made according to the invention weighs only approximately one tenth as much as a tube made according to the present state of the art with the same mechanical properties, especially with the same tensile strength.

Essential for the desired high degree of tensile strength of the tube made by the process according to the invention is that the fibers are arranged at least partially and essentially in axial direction to the tube. They absorb deflection stress. So as not to weaken the compound arrangement of the fibers, an important characteristic of the invention envisions that the fibers are arranged around the moldings forming the apertures without severing the fibers. This enables the fibers to assume their task of absorbing stress which occurs during operation despite the moldings provided for the apertures because they are shifted only insignificantly and locally from their original position. Of course, it does not hurt if a few fibers are severed, e.g. accidentally, as long as the tube withstands the required deflection stress.

The advantages of such a light weight tube or expansion shaft so enhanced, respectively, are obvious. For instances, only smaller masses have to be pivoted, accelerated and decelerated.

For the honeycomb material a honeycomb structure made of paper or a man-made material is used. The epoxy combines the sandwich compound inseparably to form to form a one-piece tube.

The inside fiber stratum and the outside fiber stratum will be constructed as required. It may be sufficient to make the inside fiber stratum and the outside fiber stratum of one layer each. Especially good results are achieved if the inside fiber stratum is made out of a fiber web with a fiber cable applied to its outside. The fiber web provides a smooth surface in the production of a tube so that this—if necessary by means of a suitable parting compound—is easily removed from a mandrel on which the tube as per this invention is constructed. Furthermore, the fiber web provides the basic structure for the fiber cables applied thereto. A fiber cable as per the subject invention is to be understood to be a large number of fibers arranged in axial direction to the tube. These primarily effect the intended high degree of deflection resistance of the tube.

For the outside fiber stratum, a multilayered structure is preferred as well whereby the outside fiber stratum seen from the inside to the outside should preferably comprise a fiber web, a fiber cable and a fiber band sealing the outside. The fiber web seals off the honeycomb material and keeps liquid epoxy from penetrating the honeycombs. It also provides the necessary structure for the layer of fiber cables above, which in this case are also arranged essentially lengthwise (axial direction) to the tube and contribute essentially to the desired high degree of deflection resistance of the tube. The structure is sealed from the outside by means of a fiber band which provides the necessary smooth outer surface of the tube.

With regard to the structure of the outside fiber stratum, the same as was said about the inside fiber stratum applies, i.e. the fiber web should preferably be formed much like a stocking with strands of fibers crisscrossing at sharp angles. The fiber cable consists essentially of a large number of fibers arranged in axial direction all around the tube, essentially parallel to each other and only moderately twisted. Finally, the fiber band also consists of fibers essentially arranged in axial direction which, however, are joined to form a flat, easily handled band by bias threads. The fiber band does not have to be arranged in an axial direction, but may be coiled.

Any intermediate fiber strata may be formed in the same way as the inside fiber stratum.

In general terms it should be mentioned that the structure compound of the fiber strata does not have to consist of pure carbon fibers. However, long continuous carbon fibers or aramid fibers should be the primary component. Other fibers may be blended in, for instance fiber glass.

In the following, the invention is described further by way of example which will illustrate further important characteristics. The example cites carbon fibers. In their place or in addition, aramid fibers may be used or fibers made of other materials which meet the necessary specifications especially with regard to the tensile strength.

BEST MODE FOR CARRYING OUT THE INVENTION

Figure 1:
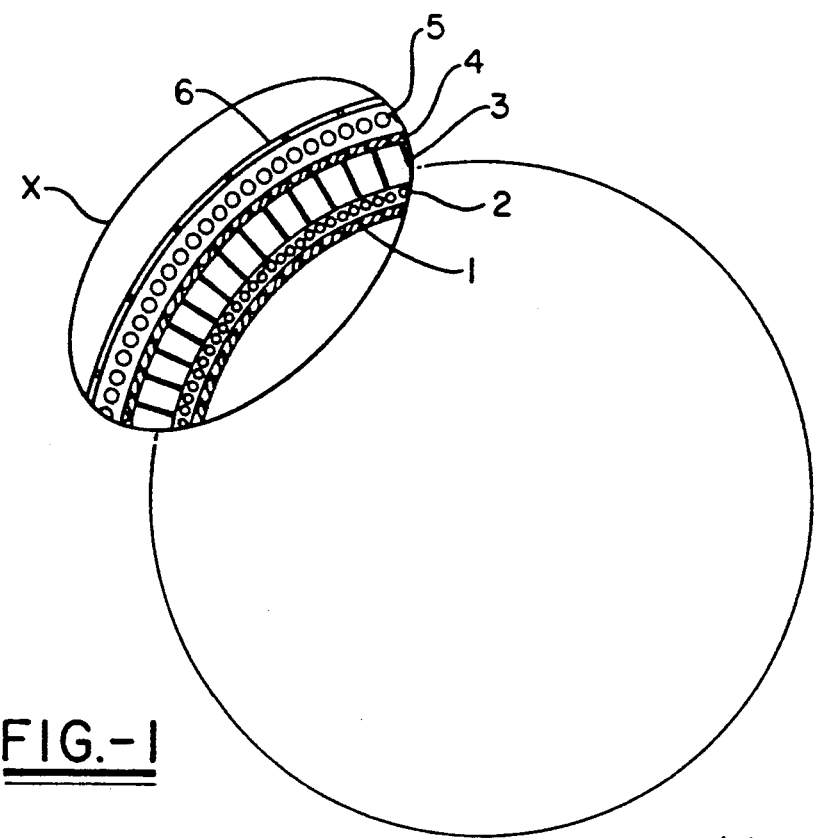
FIG. 1 shows the diagram of a face view of the tube as per subject invention with the structure of the tube in detail shown inside oval X, enlarged for illustration purposes.

The perforated tube of this invention comprises an inside stratum 1, 2; a middle layer 3 made of honeycomb material; and an outside stratum 4, 5, 6.

The inside stratum comprises a carbon fiber web 1 with a carbon fiber cable 2 to the outside thereof.

Figure 2:
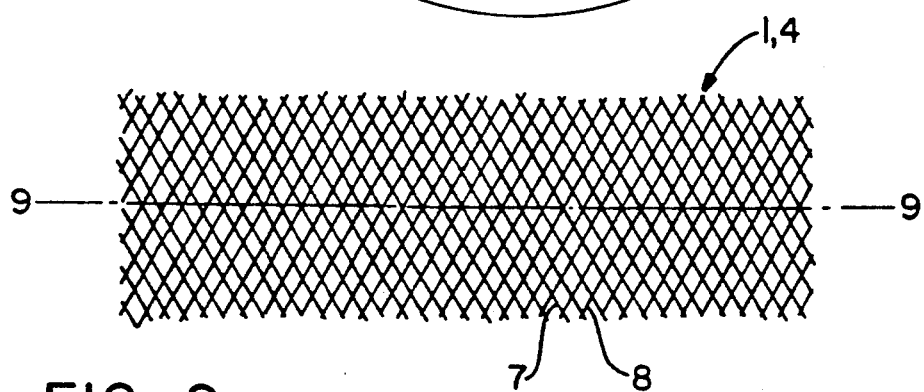
FIGS. 2-5 show in enlarged scale and top view a carbon fiber web, a carbon fiber cable, a carbon fiber band and honeycomb material in this sequence.

FIG. 2 shows a top view of the carbon fiber webs 1 and 4. As shown in FIG. 1, carbon fiber webs 1 and 4 each have strands 7, 8 of carbon fibers extending in two directions and crisscrossing at sharp angles. Axis 9 of the tube is also shown in this figure, and it will be observed that both sets of strands 7 and 8 are disposed at sharp angles to the axis 9 of the tube.

Figure 3:
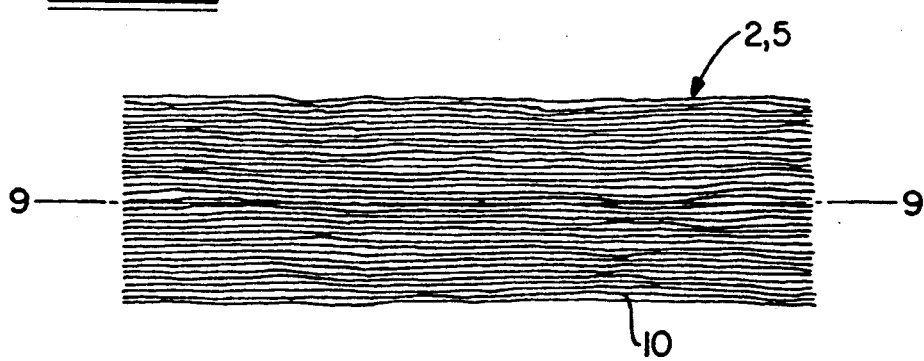

FIG. 3 shows, also in top view, a carbon fiber cable 2 or 5, each of which consists of a large number of twisted carbon fibers arranged in the axial direction 9 and essentially parallel to each other.

The outside fiber stratum comprises a carbon fiber web 4, which corresponds to the fiber web 1 and is similar or identical thereto. A carbon fiber cable 5 corresponding to carbon fiber cable 2 (similar or identical thereto) is placed over the carbon fiber web 4, and towards the outside the tube is covered by a carbon fiber band 6. This preferably coils around the tube.

Figure 4:
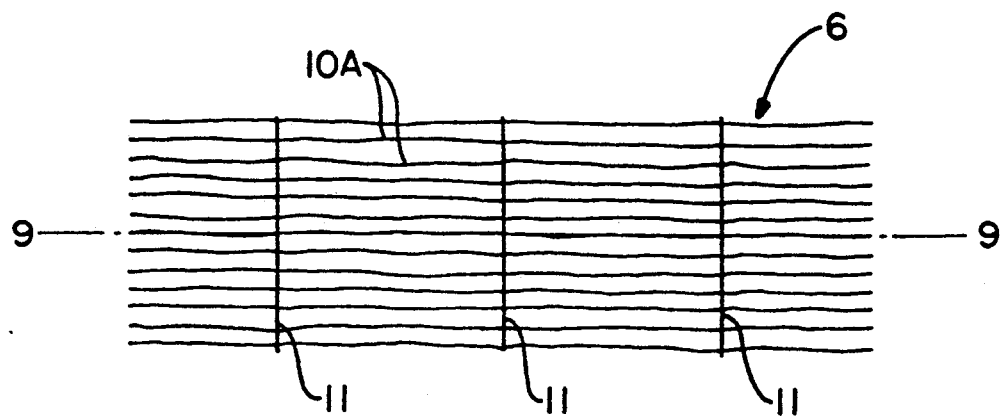

FIG. 4 shows the carbon fiber band 6 in top view. As shown in FIG. 4, carbon fiber band 6 consists of carbon fibers 10A joined by bias threads 11 to form a band. Carbon fibers 10A are essentially parallel to axis 9.

Figure 5:
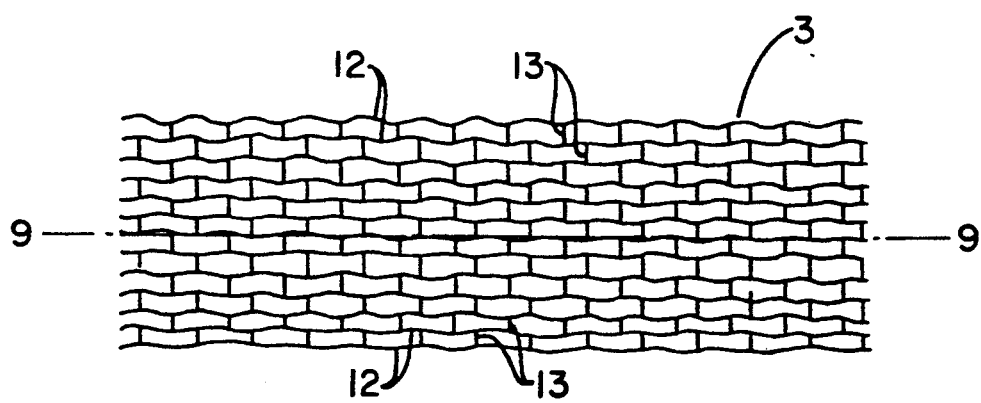

Referring now to FIG. 5, the middle layer comprises a honeycomb material 3 made up of a suitable paper material which is varnished or saturated with epoxy as required. This is a commercially sold product. As shown in FIG. 5, honeycomb material 3 has lengthwise webs 12, which are joined with bias webs 13 in a staggered pattern. Lengthwise webs 12 are arranged in the axial direction 9 and are essentially parallel to each other. In reality, the honeycomb material is formed by wave-like or generally sinusoidal bands which are glued to each other at the bases of the U-profiles. The double-layered bases form the bias webs 13 and the sides of the U-profiles form the lengthwise webs 12.

After appropriate completion the described tube serves as an expansion shaft.

Figure 6:
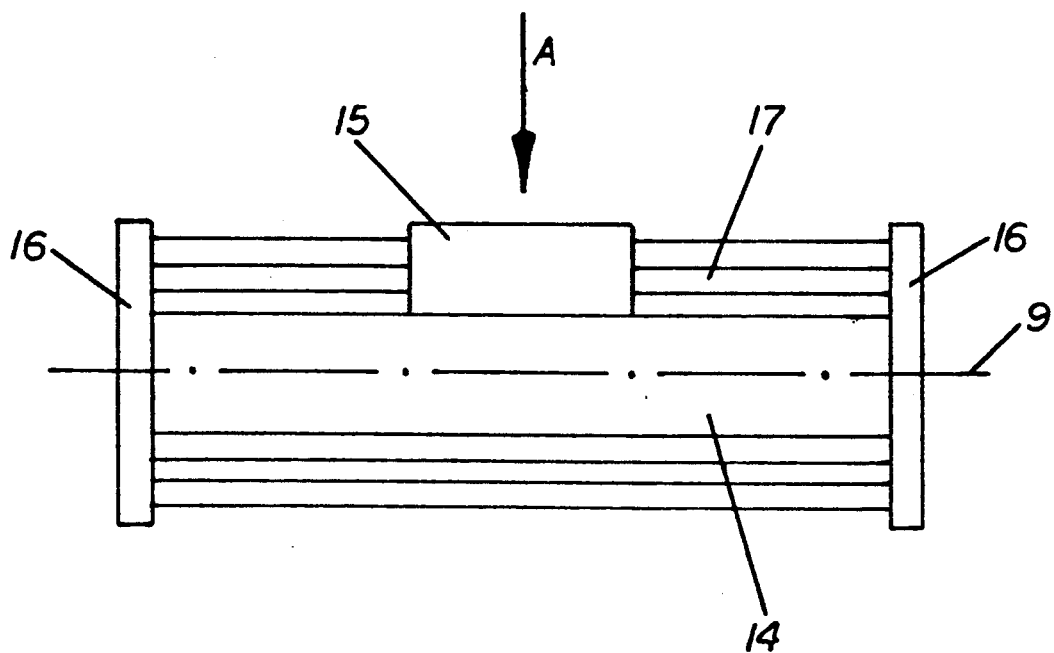
FIG. 6 is a diagram of a side view to illustrate the production process as per subject invention.
Figure 7:
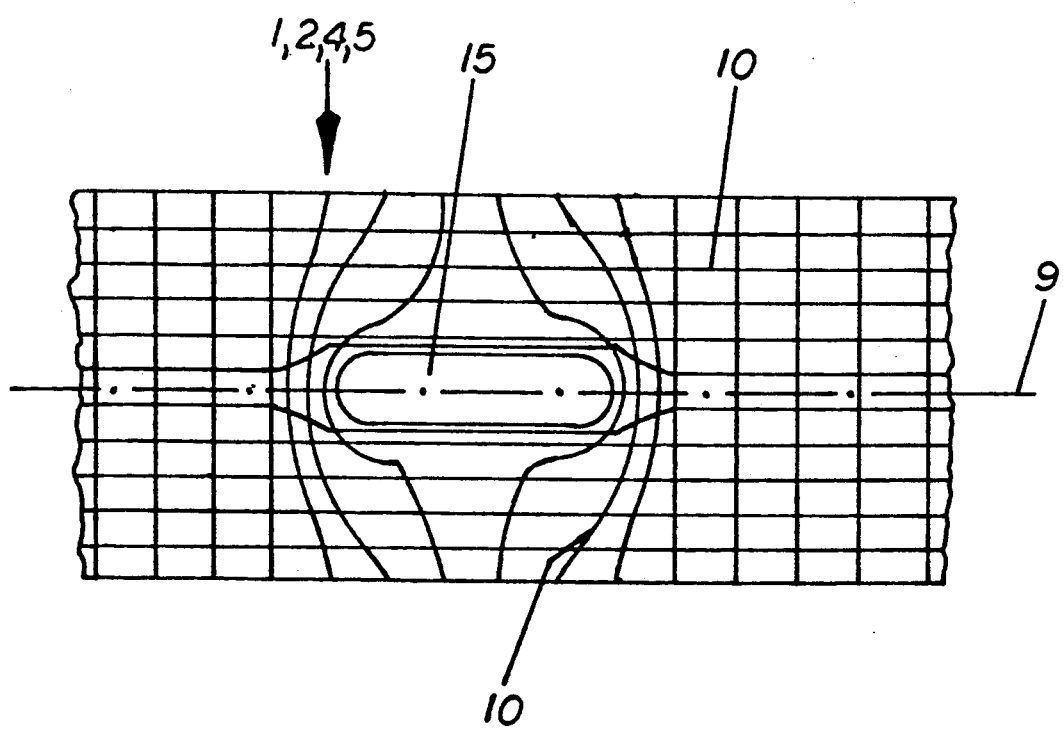
FIG. 7 is a diagram of the face view of a section of FIG. 6 in the direction of the arrow A, illustrating the production process as per subject invention.

FIG. 6 and 7 illustrate in detail the operational steps for the production of such a tube. FIG. 6 shows a mandrel 14 (cylinder or tube) to which projections or moldings 15 corresponding to the apertures to be made in the tube are attached. The moldings, for instance, consist of sheet metal pieces shaped accordingly which are glued to the mandrel 14. Other ways to fasten and produce the moldings are also possible. Furthermore it should be mentioned that for reasons of simplicity only one of the moldings is shown in FIG. 6. In reality there are several of these moldings, if necessary with different measurements and/or shapes. Rings 16 are pushed onto the ends of the mandrel 14 to complete the mandrel.

The sandwich structure 17 illustrated above in FIGS. 1 through 5 is applied to the mandrel whereby the carbon fibers 7, 8, 10 in the area of the moldings 15 are not severed but are placed around the respective moldings 15 as per subject invention without severing them as shown in FIG. 7. The apertures in the honeycomb material 3 aligned with the moldings 15 are previously cut out of the honeycomb material (i.e., they are cut out before a sandwich which includes honeycomb material 3 is assembled). These apertures may be cut by stamping or with the help of a knife.

Then the sandwich is saturated with epoxy and after the hardening of the epoxy the moldings 15 are removed and the completed tube with its apertures aligned with the moldings 15 can be pulled off the mandrel 14. It may then be completed as an expansion shaft or a winding shaft.

Good results have been achieved with a tube having the following construction (all fiber strata being epoxy impregnated):

The inside stratum consists (from its inside to its outside) of: a tube consisting of the web of FIG. 2; followed by a spirally wound band 6 of FIG. 4, its spiral angle being preferably between 30° and 55°; followed by a cable of FIG. 3 or a band of FIG. 4 and extending in axial direction, followed by a spirally wound band 6 of FIG. 4; followed by a fleece for closing the openings of the honeycomb material 3.

The structure of the tube of FIG. 2 is to enable to withdraw the completed tube from the mandrel. The spirally wound bands of FIG. 4 are to compact the material under them for better impregnating that material. They also smooth that material. The main purpose of the axial band of FIG. 3 or 4 is to give to the tube its bending strength.

The outside stratum consists (from its inside to its outside) of: a fleece for closing the openings of the honeycomb material; followed by a spirally wound band of FIG. 4; followed by the axial bands of FIGS. 3 and 4; followed by another spiral band of FIG. 4.

The structure consisting of the honeycomb material 3 and the outside stratum and/or inside stratum can be repeated one or several times to improve the strength of the tube.

What is claimed is:

1. Process for the manufacture of a perforated tube for an expansion shaft, said tube having a longitudinal axis and having apertures to be formed therein, which comprises:

(a) providing a mandrel having a diameter matching the desired inside diameter of said tube and having projections corresponding to apertures to be formed in the perforated tube;

(b) applying to the mandrel a plurality of spaced fiber strata, each comprising long continuous fibers, and one or more honeycomb layers, each honeycomb layer being sandwiched between successive fiber strata so that the fiber strata and the honeycomb layers are in alternating sequence forming a sandwich structure; the fibers of said fiber strata being applied around the projections such that substantially no fibers are severed;

(c) saturating the fiber strata of the sandwich structure with an epoxy resin and allowing the epoxy to harden;

(d) removing a resulting perforated tube from the mandrel (e) wherein said plurality of spaced fiber strata comprises, from the inner diameter to an outer diameter of the tube, an inside fiber stratum and an outside fiber stratum with a honeycomb layer disposed therebetween, wherein the fibers of said inside and outside fiber stratum are carbon fibers, aramid fibers or a mixture of carbon and aramid fibers and wherein said inside fiber stratum comprises a first fiber layer and a fiber cable layer applied thereto wherein the fibers of said first fiber layer are in the form of a web which comprises a plurality of continuous fibers extending in two directions in crisscross relationship and wherein said fiber cable layer comprises said long continuous fibers, said fibers of said cable being essentially aligned in the axial direction of said tube, and wherein said outside fiber stratum comprises a first fiber layer, a fiber cable layer and an outer fiber band arranged in that order, wherein the fibers of said first fiber layer are in the form of a web which comprises a plurality of continuous fibers extending in two directions in crisscross relationship said first fiber layer being closer to the mandrel that said outer band, and wherein said fiber cable layer comprises said long, continuous fibers, said fibers of said cable being essentially aligned in the axial direction of said tube.

2. A process according to claim 1 wherein at least three fiber strata and at least two layers of honeycomb material are applied to said mandrel.

3. A process according to claim 1 in which openings corresponding to said projections are cut out of the honeycomb material.

4. A process according to claim 1 wherein said honeycomb is made of paper or synthetic material.

5. A process according to claim 1 wherein each of said fiber cable layers comprises a large number of twisted carbon fibers arranged in the axial direction and essentially parallel to each other.

* * * * *